US012508555B2

(12) United States Patent
Beylefeld

(10) Patent No.: US 12,508,555 B2
(45) Date of Patent: Dec. 30, 2025

(54) LIQUID AND SLURRY MIXERS

(71) Applicant: Barend Jacobus Beylefeld, Roches Noires (MU)

(72) Inventor: Barend Jacobus Beylefeld, Roches Noires (MU)

( * ) Notice: Subject to any disclaimer, the term of this patent is extended or adjusted under 35 U.S.C. 154(b) by 686 days.

(21) Appl. No.: 17/908,011

(22) PCT Filed: Mar. 5, 2021

(86) PCT No.: PCT/IB2021/051857
§ 371 (c)(1),
(2) Date: Aug. 30, 2022

(87) PCT Pub. No.: WO2021/176412
PCT Pub. Date: Sep. 10, 2021

(65) Prior Publication Data

US 2023/0191341 A1 Jun. 22, 2023

(30) Foreign Application Priority Data

Mar. 5, 2020 (ZA) ............................ ZA2020/01402

(51) Int. Cl.
*B01F 25/10* (2022.01)
*B01F 23/50* (2022.01)
*B01F 25/50* (2022.01)
*B01F 33/81* (2022.01)
*B01F 35/00* (2022.01)
*B01F 35/71* (2022.01)

(52) U.S. Cl.
CPC ............ *B01F 25/102* (2022.01); *B01F 23/59* (2022.01); *B01F 25/103* (2022.01); *B01F 25/50* (2022.01); *B01F 33/813* (2022.01); *B01F 35/55* (2022.01); *B01F 35/7176* (2022.01)

(58) Field of Classification Search
CPC ............................... B01F 25/50; B01F 25/102
See application file for complete search history.

(56) References Cited

U.S. PATENT DOCUMENTS 4,539,103 A * 9/1985 Hollingsworth ........ B03B 5/623 209/454
5,290,433 A * 3/1994 Chan ...................... C10G 1/045 422/271
2006/0251778 A1 11/2006 Osipenka
2015/0266206 A1* 9/2015 Arbour .................. B01F 25/64 241/15

* cited by examiner

*Primary Examiner* — Elizabeth Insler

(57) ABSTRACT

A mixing vessel comprises a top portion (12) on an inverted conical middle portion (14) and a mixing chamber (16) below the middle portion. A launder (28) surrounds the upper part of the top portion. Solution from the launder is led to a vertical pipe (46) including a motor driven impeller (42) down to the level of the mixing chamber. Two feed pipes (47, 48) lead from the vertical pipe to enter the mixing chamber tangentially in opposite directions.

14 Claims, 5 Drawing Sheets

LIQUID AND SLURRY MIXERS

This is a US national phase entry of PCT application number PCT/IB 2021/051857 filed Mar. 5, 2021 with a priority date of Mar. 5, 2020 based on application number 2020/01402 filed in South Africa.

This invention relates to liquid and slurry mixers.

According to the invention there is provided a mixer comprising a vessel having a base plate and a launder at its upper end,

- a frame mounted on the side and upper end of the vessel,
- a motor, preferably a variable speed motor, carried by the frame,
- vertical pipe underneath the launder and extending to the lower end of the vessel,
- a pump within the vertical pipe and connected to the motor to be driven through a drive shaft, and
- two feed pipes tangentially entering into the bottom portion of the vessel and extending from the lower end of the pipe.

The upper end of the vertical pipe is located, in use, somewhat lower than the level of the liquid and slurry in the vessel. The liquid thus enters the upper end of the vertical pipe and is driven downwardly by the pump to the two feed pipes in the bottom chamber of the vessel which directs the flow tangentially in opposite directions, causing very good mixing. Means are provided projecting into the lower portion of the vessel and inhibiting the upward movement of the liquid/slurry before moving inwardly beyond the said means whereafter the liquid/slurry is permitted to pass upwardly above the said means so that the liquid/slurry that has been passed down the vertical pipe will mix well with the liquid/slurry material in the vessel below and above the said means. Thus, the liquid that has been passed down the vertical pipe will mix well with the liquid/slurry in the vessel below and above the said means which are often called "shoulder rings". The pump and motor frame are preferably removably connected to the vessel so that it can be easily removed therefrom for repair or replacement.

Each "shoulder ring" preferably comprises an outer wall mounted ring that could divided into a number of segments with slots or holes. The shoulder rings improve the turbulence in the bottom mixing chamber as well as ensuring even upflow distribution in the upper part of the vessel.

The pump preferably comprises a helical impeller mounted on the motor drive shaft. A stator surrounds the shaft preferably below the helical impeller to provide support for the shaft and to break the swirl effect. A second stator can be added above the impeller to minimise air intake into the liquid/slurry.

The mixer can be used as a single unit or part of a group of mixers.

An embodiment of the invention will now be described by way of example with reference to the accompanying drawings.

In the drawings:—

Figure 1:
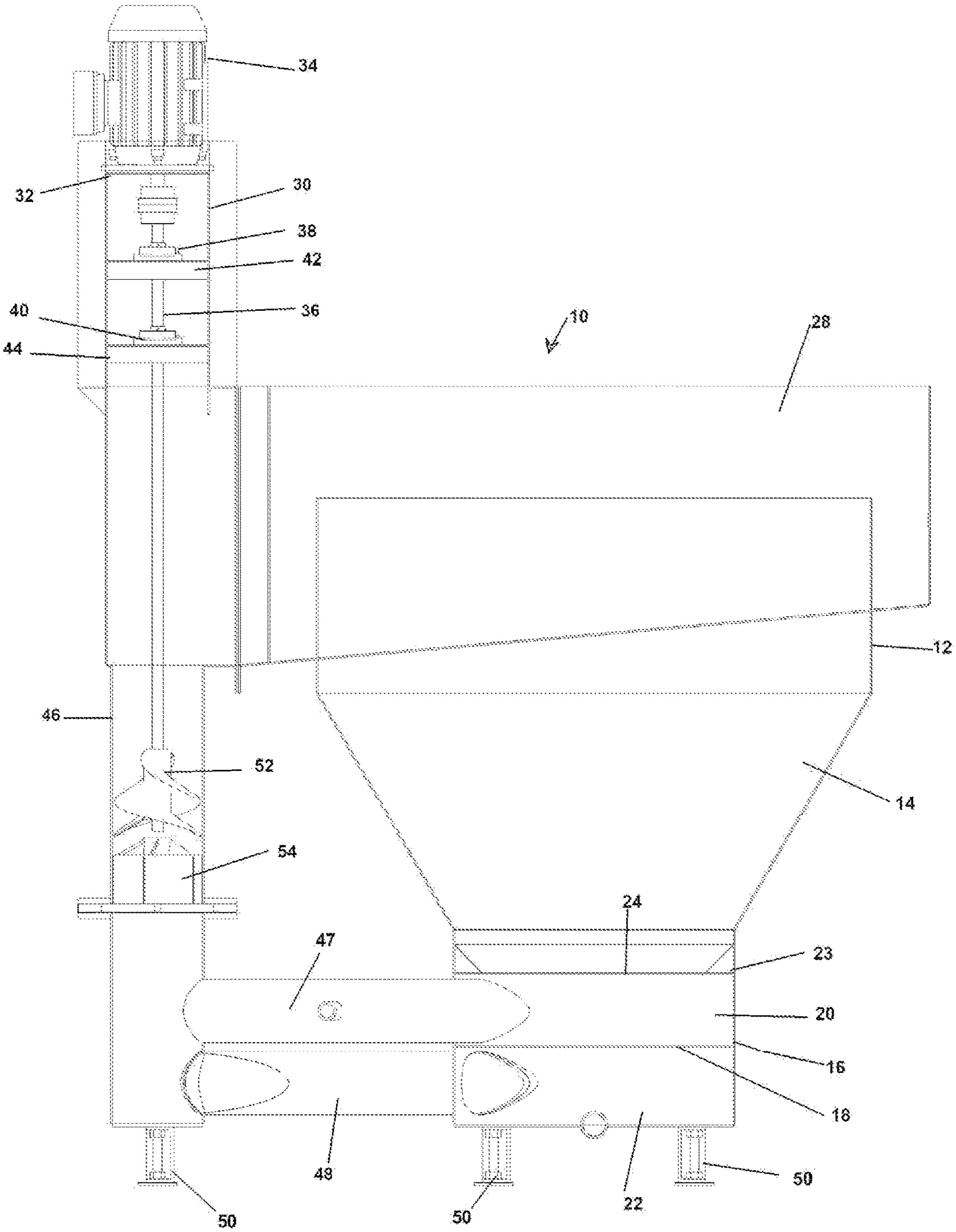
FIG. 1 is a side view of a conical mixer tank in which is contained a mixer of the invention.
Figure 2:
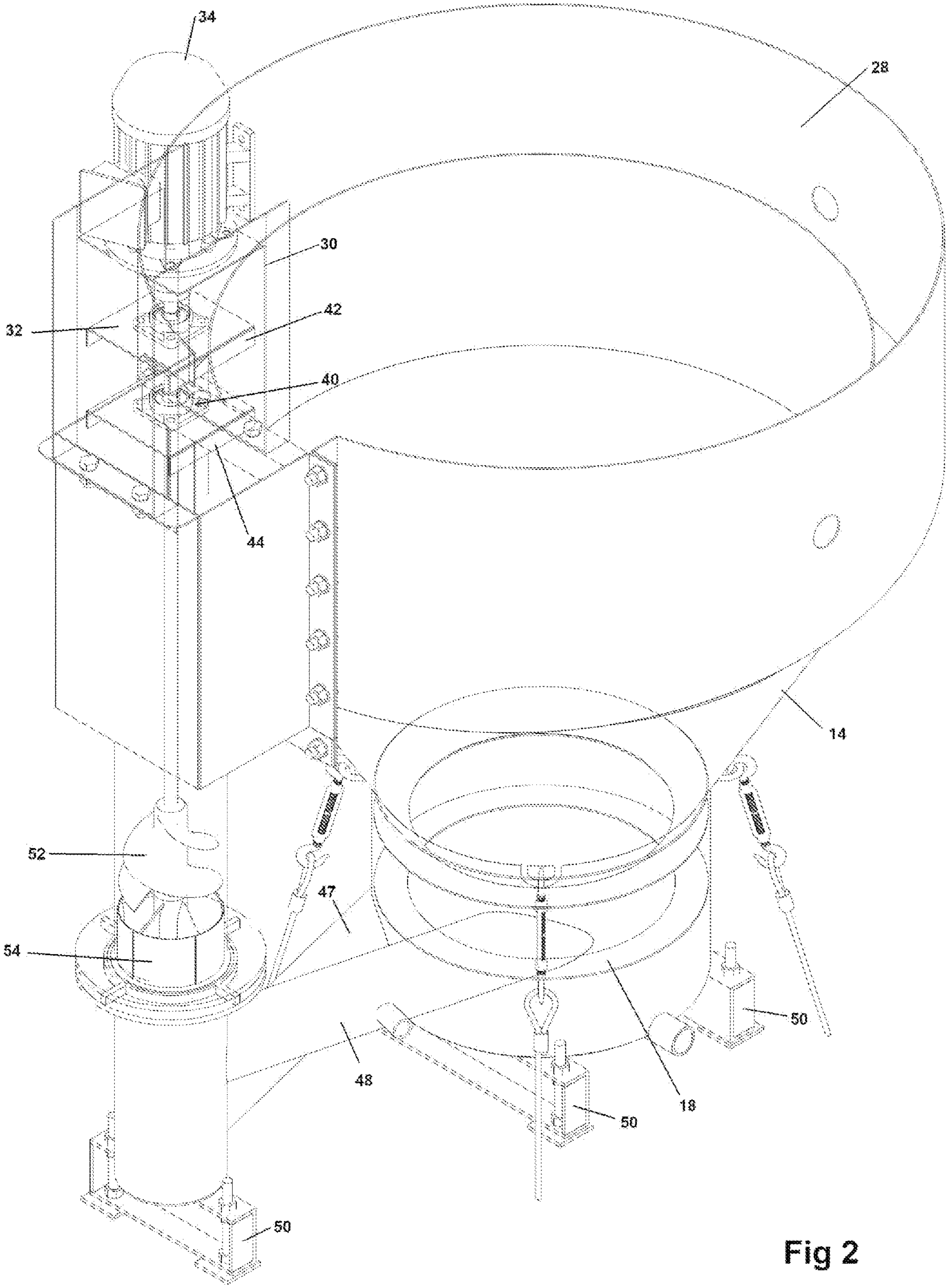
FIG. 2 is a perspective view of the conical mixer tank.
Figure 3:
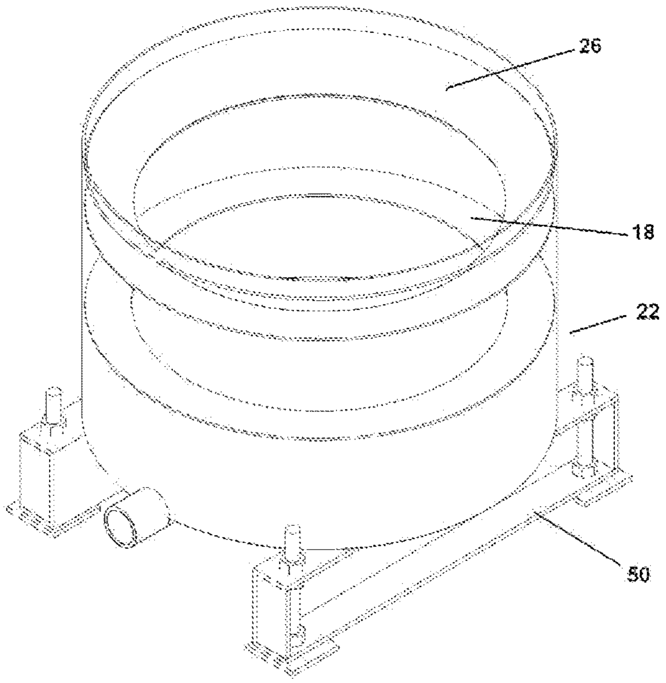
FIG. 3 is a perspective view of the mixing chamber.
Figure 4:
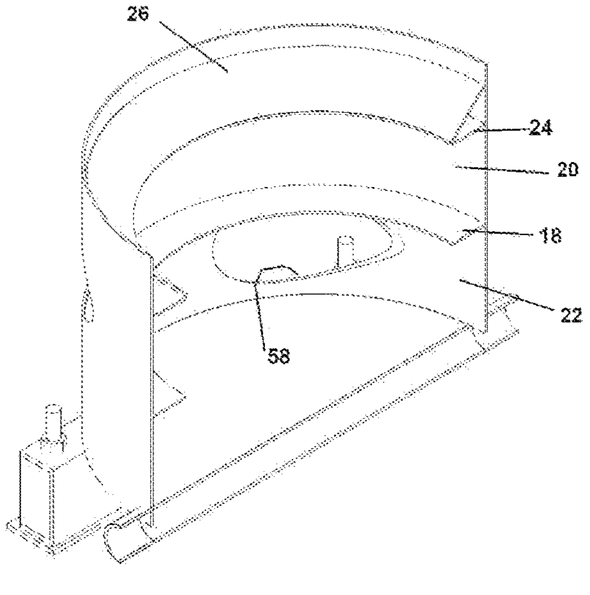
FIG. 4 is a perspective view partially in section of the mixing chamber.

Referring now to the drawings there is shown a mixer 10. The mixer 10 comprises an upper cylindrical vessel tank section 12 on a conical tank section 14 which rests on a bottom mixing chamber 16. The bottom mixing chamber 16 is divided by a "bottom shoulder ring" or shelf 18 into upper and lower parts 20 and 22. There is an upper "shoulder ring" 24 at the top of the mixing chamber 16 and this has an inclined ring 26 running from the inner edge of the upper shoulder ring 24 (see FIG. 4) to the top edge of the mixing chamber 16. The upper edge of the upper cylindrical tank section 12 has an overflow launder 28.

Mounted on the top portion of the tank 12, the launder 28 carries a removable frame 30. The frame 30 carries at its centre a platform 44 on which is vertically mounted a variable speed drive motor 34. The motor 34 has a vertical motor driveshaft 36 rotatably mounted in bearings 38 and 40 carried on upper and under platforms 42 and 44 on the frame 30. Below the platform 44 is a vertical pipe 46. The driveshaft 36 is contained within the vertical pipe 46 and extends to the bottom of the mixer 12. The pipe 46 and the mixer 10 are mounted on ground engaging carriers 50.

Within the lower part of the vertical pipe 46 and within the pipe is a pump in the form of a helical impeller 52. Below the impellor 52 is a stator 54 to remove or minimise the swirl in solution being driven by the impeller 52.

At the bottom end of the vertical pipe 46 are two distribution pipes 47 and 48 that enter respectively the upper and lower parts of the mixing chamber 16 in a tangential direction so that the water from the upper distribution pipe 48 enters the mixing chamber 16 clockwise and the lower distribution pipe 47 guides the solution into the lower part of the mixing chamber 16 in a counter-clockwise direction. The upper edge of the vertical pipe 46 is slightly below the lower part of the launder 28 and in use the liquid/slurry enters the pipe and then is forced down the pipe by the impeller 52 to the mixing chamber 16. The solution mixes tangentially and counter currently and passed the shoulder rings 18 and 24 so that the liquid/slurry moves upwardly in the vessel and causes the solution/slurry to mix with the material and maintain suspension.

Figure 5:
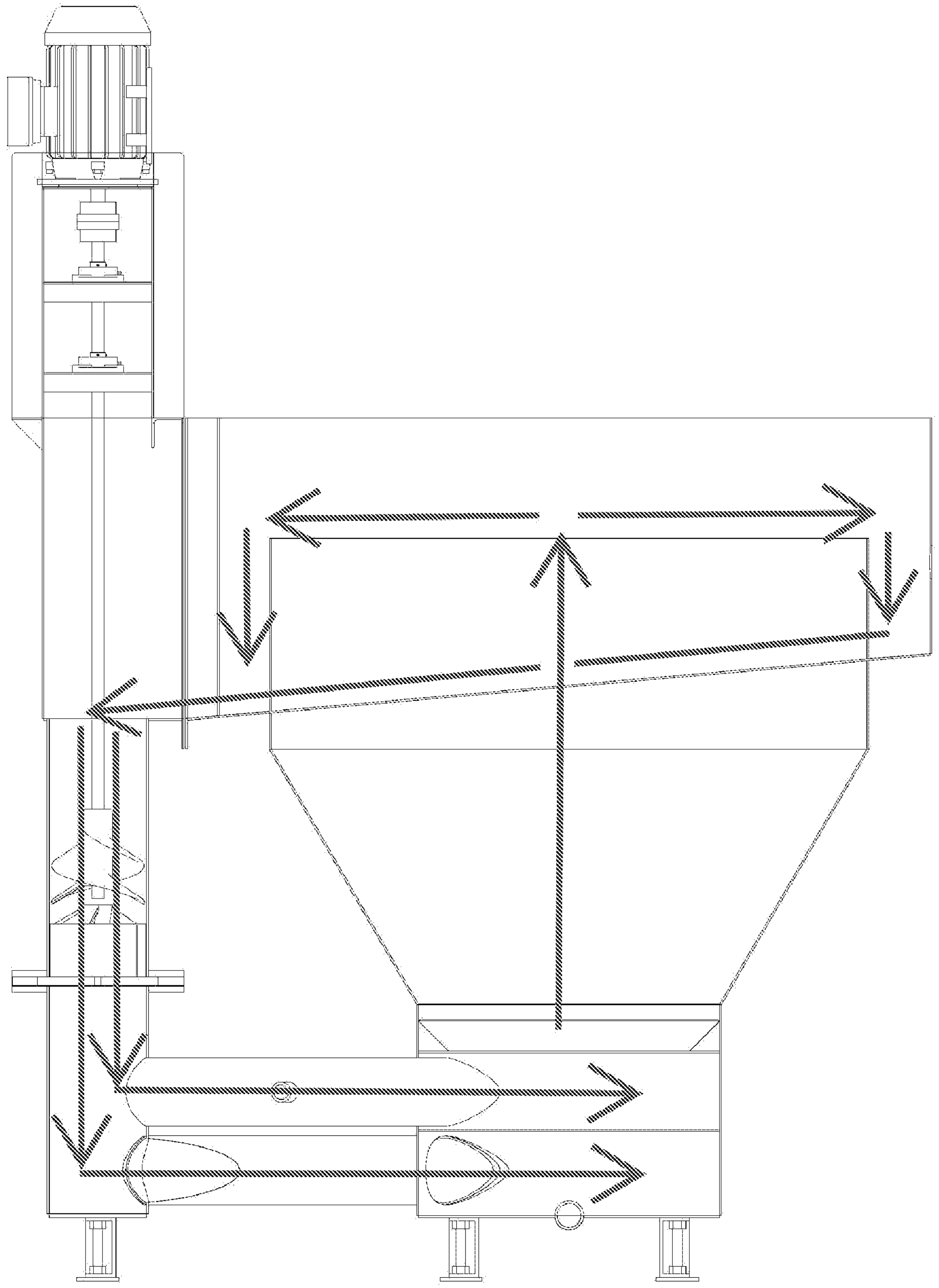
FIG. 5 is a diagrammatic view showing the liquid slurry flow.

Reference is made to FIG. 5 where the direction of movement of the solution is given by arrows as can be seen in which the liquid/slurry moves over the top edge of the upper tank section 12 and down into the launder 28. Then the liquid/slurry runs down the base of the launder 28 and into the vertical pipe 46.

In a typical use of the vessel 10 it serves to mix solution and particles (solids for either the leaching process or for an absorption process). The mixer can be used to mix any solution, reagent or slurry as an example. The vessel can also be used for flotation and as a jig (particle separation).

It will be seen that the vessel 10 with the pump as described above is more efficient than the agitator/mixer units used currently. By having a variable speed drive motor 34 it is possible to avoid the necessity of using gearboxes as is required in apparatus used heretofore. The variable speed drives give full flow control for mixing and suspending the materials. The embodiments above-described provides extremely good mixing of, for example, any solution and solids. It will further be seen that the pump/mixer unit is easy to maintain as it can be taken out of the tank even when there is solution and/or solids in the tank and then repaired or replaced with a new pump/mixer unit.

It will also be seen that the pump/mixer unit 10 draws solution from the top of the tank or vessel 12 and transfers it through the vertical pipe 46 via the impeller 52 to the bottom of the vessel and thereafter the flow of the solution is upward in the direction that the particle suspension is required this provides more efficient mixing compared to conventional mixer/agitators. We have also found that this arrangement enables much better absorption apparatus than currently in use of which we are aware.

Figure 6:
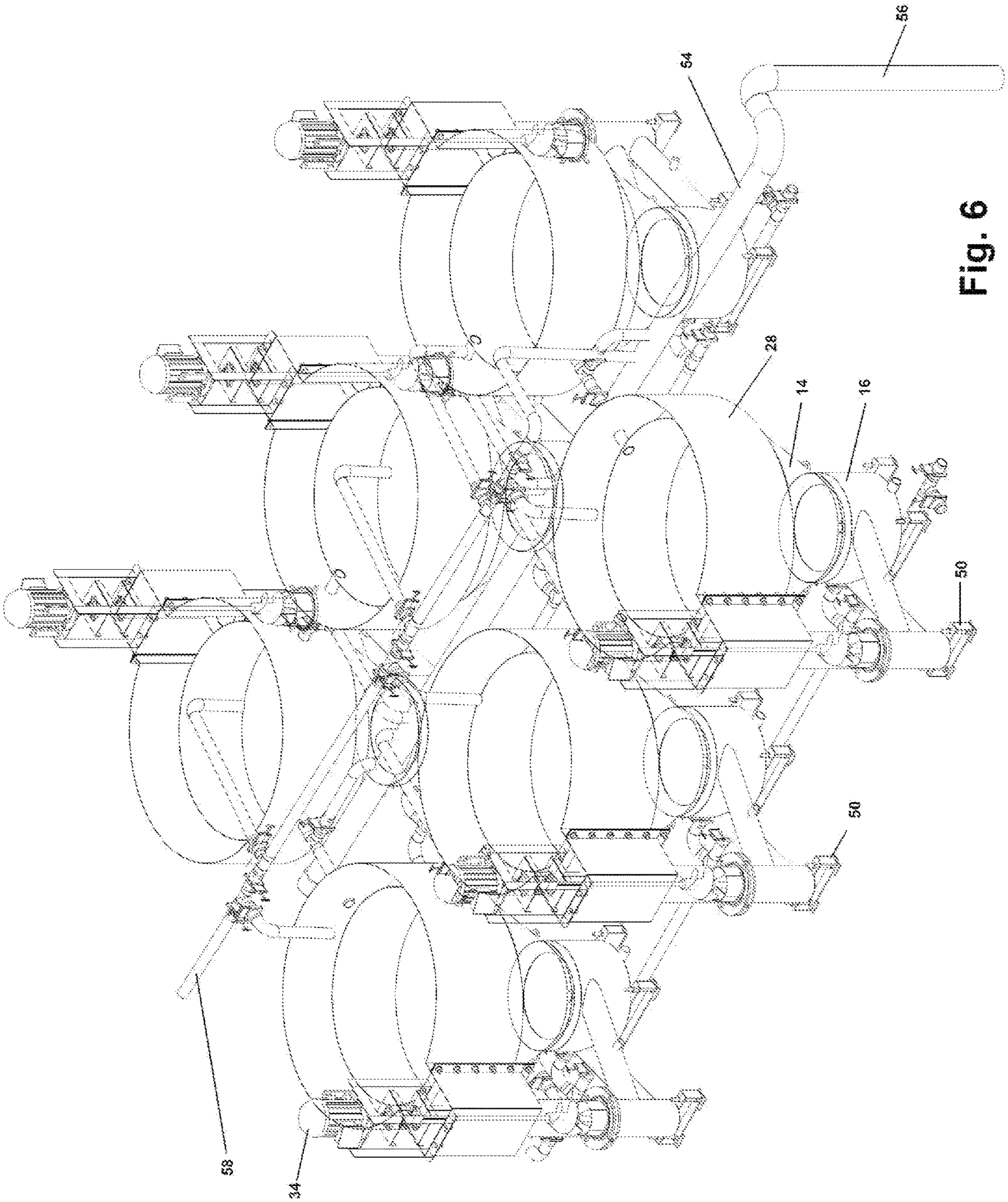
FIG. 6 is a view of a carousel of six mixer tanks of the invention.

The mixing vessel can be used as a single unit. It can also be used with others to form a carousel as shown in FIG. 6. The mixers are placed into lines of three and the mixers are in pairs. Running down the middle of the two lines of mixers is a tails slurry manifold 54 ending in a downpipe 56 leading to the tails slurry (not shown). Two parallel tank drainpipes join near one end connected to the six mixers then there is a feed slurry manifold 58 leading to the six mixers and then leads to a bypass to the tails manifold 56 near the end thereof.

Valves are provided so that the connections to and from the six mixers to the slurry feed; connections from the mixers to the tails manifold 56; and from the other six mixers to the tank drain can be varied so that the order in which the mixers are connected to the manifolds can be altered as desired.

The invention is not limited to the precise constructional details hereinbefore described and illustrated in the drawings. For example, there may be two pumps each connected to a downpipe forcing the solution downwards and respectively to the two distribution pipes. The numbers of mixers may be increased or decreased in the carousel.

The invention claimed is:

1. A liquid and slurry mixer comprising a vessel having a base plate and a launder at its upper end, a frame mounted on the side and upper end of the vessel, a motor, carried by the frame, a vertical pipe underneath the launder and extending to the lower end of the vessel, a pump within the vertical pipe and connected to the motor by a drive shaft to be driven thereby, and two feed pipes tangentially entering into the bottom portion of the vessel and extending from the lower end of the vertical pipe.

2. A liquid and slurry mixer as claimed in claim 1 wherein the upper end of the vertical pipe is located, somewhat lower than the level of the lowest part of the launder.

3. A liquid and slurry mixer as claimed in claim 2 wherein the pump is configured to drive the liquid that enters the upper end of the vertical pipe and downward to the two feed pipes in the bottom portion of the vessel which directs the flow tangentially in opposite directions, causing very good mixing.

4. A liquid and slurry mixer as claimed in claim 3 wherein there is provided means projecting into the lower portion of the vessel and inhibiting the upward movement of the liquid/slurry before moving inwardly beyond the said means whereafter the liquid/slurry is permitted to pass upwardly above the said means so that the liquid/slurry that has been passed down the vertical pipe will mix well with the material in the vessel below and above the said means.

5. A liquid and slurry mixer as claimed in claim 4, wherein the two feed pipes comprise an upper feed pipe and a lower feed pipe, and wherein the said means comprises a pair of vertically spaced horizontal annuli or collars secured to the inside of the vessel and projecting a small amount into the vessel and being located with one above the upper feed pipe and the other above the lower feed pipe.

6. A liquid and slurry mixer as claimed in claim 5 wherein the annuli or collars is/are provided with slots or holes.

7. A liquid and slurry mixer as claimed in claim 1 wherein the pump and motor frame are removably connected to the vessel so that either or both can be easily removed therefrom for repair or replacement.

8. A liquid and slurry mixer as claimed in claim 1 wherein the pump comprises a helical impeller mounted on the drive shaft.

9. A liquid and slurry mixer as claimed in claim 8 wherein a stator surrounds the drive shaft to provide support for the drive shaft.

10. A liquid and slurry mixer as claimed in claim 9 wherein the stator is located below the helical impeller.

11. A liquid and slurry mixer as claimed in claim 10 further comprising a second stator above the impeller to minimise air intake into the liquid/slurry.

12. A liquid and slurry mixer as claimed in claim 1 wherein the motor is a variable speed motor.

13. A carousel of mixers as claimed in claim 1.

14. A carousel as claimed in claim 13 including a tails slurry manifold, a tank manifold and a feed slurry manifold and valves connecting the manifolds and mixers so that the order of the connections can be varied.

* * * * *